US011173860B2

(12) United States Patent
Akaba

(10) Patent No.: US 11,173,860 B2
(45) Date of Patent: Nov. 16, 2021

(54) OCCUPANT PROTECTION DEVICE, METHOD FOR CONTROLLING OCCUPANT PROTECTION DEVICE AND PROGRAM

(71) Applicant: HONDA MOTOR CO., LTD., Tokyo (JP)

(72) Inventor: Hiroshi Akaba, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 136 days.

(21) Appl. No.: 16/491,585

(22) PCT Filed: Mar. 14, 2017

(86) PCT No.: PCT/JP2017/010145
§ 371 (c)(1),
(2) Date: Sep. 6, 2019

(87) PCT Pub. No.: WO2018/167837
PCT Pub. Date: Sep. 20, 2018

(65) Prior Publication Data
US 2020/0001813 A1 Jan. 2, 2020

(51) Int. Cl.
*B60R 21/00* (2006.01)
*B60R 21/015* (2006.01)
(Continued)

(52) U.S. Cl.
CPC .... *B60R 21/01554* (2014.10); *B60R 21/0132* (2013.01); *B60R 22/46* (2013.01);
(Continued)

(58) Field of Classification Search
CPC .......... B60R 21/01554; B60R 21/0132; B60R 22/46; B60R 2021/01272; B60R 2021/01286; B60R 2021/01327
See application file for complete search history.

(56) References Cited

U.S. PATENT DOCUMENTS 9,517,767 B1 * 12/2016 Kentley ............... B60W 30/08
701/23
9,744,933 B1 * 8/2017 Rao ..................... B60N 2/143
(Continued)

FOREIGN PATENT DOCUMENTS

CN 1498173 5/2004
CN 1741925 3/2006
(Continued)

OTHER PUBLICATIONS

International Search Report and Written Opinion for International Application Serial No. PCT/JP2017/010145 dated May 23, 2017, 5 pages.
(Continued)

*Primary Examiner* — Thomas G Black
*Assistant Examiner* — Brittany Renee Peko
(74) *Attorney, Agent, or Firm* — Amin, Turocy & Watson, LLP

(57) ABSTRACT

An occupant protection device includes: a collision prediction unit configured to predict a collision state including a collision direction in a vehicle; a seat direction detection unit configured to detect a direction of a seat that is rotatable around a vertical axis of the vehicle with respect to the vehicle; a driving unit configured to adjust a degree of tension of a seatbelt; and a control unit configured to control the driving unit in accordance with the collision direction with respect to the vehicle predicted by the collision prediction unit and the direction of the seat with respect to the vehicle detected by the seat direction detection unit to change the degree of tension of the seatbelt.

3 Claims, 7 Drawing Sheets

(51) Int. Cl.
*B60R 21/0132* (2006.01)
*B60R 22/46* (2006.01)
*B60R 21/01* (2006.01)

(52) U.S. Cl.
CPC ............... *B60R 2021/01272* (2013.01); *B60R 2021/01286* (2013.01); *B60R 2021/01327* (2013.01)

(56) References Cited

U.S. PATENT DOCUMENTS

| | | | |
|---|---|---|---|
| 10,647,284 B2 * | 5/2020 | Koshikawa et al. | ................... B60R 21/0134 280/730 |
| 2003/0114973 A1 * | 6/2003 | Takagi | ................... B60R 21/32 701/45 |
| 2016/0272141 A1 * | 9/2016 | Ohmura | ................ B60R 21/013 701/25 |

FOREIGN PATENT DOCUMENTS

| | | | | |
|---|---|---|---|---|
| CN | 1876448 | | 12/2006 | |
| CN | 101535092 | | 9/2009 | |
| CN | 202022179 | | 11/2011 | |
| DE | 102004010835 | | 9/2004 | |
| JP | 10-129405 | | 5/1998 | |
| JP | 2001-163183 | | 6/2001 | |
| JP | 2003-237534 | | 8/2003 | |
| JP | 2006096138 A | * | 4/2006 | ............. B60R 22/46 |
| JP | 2007276514 A | * | 10/2007 | ............... B60N 2/42 |
| JP | 2016-175513 | | 10/2016 | |

OTHER PUBLICATIONS

Japanese Office Action for Japanese Patent Application No. 2019-505555 dated May 12, 2020.
Chinese Office Action for Chinese Patent Application No. 201780088054.X dated May 24, 2021.

* cited by examiner

| | | SEAT DIRECTION | | | |
|---|---|---|---|---|---|
| | | FRONT | RIGHT SIDE | LEFT SIDE | REAR |
| COLLISION DIRECTION | FRONT | CONTROL (1) | CONTROL (2) | CONTROL (2) | CONTROL (3) |
| | RIGHT SIDE | CONTROL (2) | CONTROL (1) | CONTROL (3) | CONTROL (2) |
| | LEFT SIDE | CONTROL (2) | CONTROL (3) | CONTROL (1) | CONTROL (2) |
| | REAR | CONTROL (3) | CONTROL (2) | CONTROL (2) | CONTROL (1) |

| | | SEAT DIRECTION | | | |
|---|---|---|---|---|---|
| | | FRONT | RIGHT SIDE | LEFT SIDE | REAR |
| COLLISION DIRECTION | FRONT | CONTROL (1) | CONTROL (2) | CONTROL (2) | CONTROL (3) |
| | RIGHT SIDE | CONTROL (2) | CONTROL (1) | CONTROL (3) | CONTROL (2) |
| | LEFT SIDE | CONTROL (2) | CONTROL (3) | CONTROL (1) | CONTROL (2) |
| | REAR | CONTROL (3) | CONTROL (2) | CONTROL (2) | CONTROL (1) |
| | ROLLOVER | CONTROL (4) | CONTROL (4) | CONTROL (4) | CONTROL (4) |

OCCUPANT PROTECTION DEVICE, METHOD FOR CONTROLLING OCCUPANT PROTECTION DEVICE AND PROGRAM

TECHNICAL FIELD

The present invention relates to an occupant protection device, a method for controlling the occupant protection device and a program.

BACKGROUND ART

There have been vehicles that include seats that are rotatable in the horizontal direction since recent years. Occupants of the vehicles get in the vehicles in various seat arrangement states in some cases. However, seatbelts are mainly designed to reliably restrain the occupants in a case that in a case that the vehicles collide from the front. Accordingly, in a case that in a case that the occupants get in the vehicles in states in which the seats are rotated, there is concern of occupant protection by the seatbelts being insufficient. An occupant protection device disclosed in Patent Literature 1 performs control such that whether to operate a pretensioner of a seatbelt is selected based on a rotational direction of a detected seat and a collision direction. An occupant protection device disclosed in Patent Literature 2 detects a state in which a seat is rotated by 180° toward the rear side and performs control such that a pretensioner of a seatbelt does not operate.

CITATION LIST

Patent Literature

[Patent Literature 1]
Japanese Unexamined Patent Application, First Publication No. 2016-175513
[Patent Literature 2]
Japanese Unexamined Patent Application, First Publication No. H10-129405

SUMMARY OF INVENTION

Technical Problem

However, in the technologies of the related art, nothing but whether to operate a pretensioner of a seatbelt is controlled, and occupant protection in which the degree of tension of the seatbelt is adjusted in consideration of a relation between a rotational direction of a seat and a collision direction in a vehicle has not been performed.

The present invention is devised in view of such circumstances and an object of the present invention is to provide an occupant protection device adjusting the degree of tension of a seatbelt based on a relation between a rotational direction of a seat and a collision direction in a vehicle, a method for controlling the occupant protection device and a program.

Solution to Problem

According to an aspect, there is provided an occupant protection device including: a collision prediction unit configured to predict a collision state including a collision direction in a vehicle; a seat direction detection unit configured to detect a direction of a seat that is rotatable around a vertical axis of the vehicle with respect to the vehicle; a driving unit configured to adjust a degree of tension of a seatbelt; and a control unit configured to control the driving unit in accordance with the collision direction with respect to the vehicle predicted by the collision prediction unit and the direction of the seat with respect to the vehicle detected by the seat direction detection unit to change the degree of tension of the seatbelt.

According to another aspect, in the occupant protection device, the control unit may control the driving unit to adjust the degree of tension of the seatbelt to a first degree in a case that the collision direction is included in a predetermined angle range including a front direction seen from the seat.

According to another aspect, in the occupant protection device, the control unit may control the driving unit to adjust the degree of tension of the seatbelt to a second degree greater than the first degree in a case that the collision direction is included in a predetermined angle range including one of a left direction and a right direction seen from the seat.

According to another aspect, in the occupant protection device, the control unit may control the driving unit to adjust the degree of tension of the seatbelt to a third degree less than the first degree in a case that the collision direction is included in a predetermined angle range including a rear direction seen from the seat.

According to another aspect, the occupant protection device may further include a collision detection unit configured to detect a collision generated in the vehicle. The control unit may determine a collision aspect of the vehicle based on a detection result of the collision detection unit and control the driving unit in accordance with the collision aspect to change the degree of tension of the seatbelt.

According to another aspect, in the occupant protection device, in a case that it is determined based on the detection result of the collision detection unit that a predetermined rotation is generated in the vehicle due to the collision, the control unit may control the driving unit such that the degree of tension of the seatbelt is adjusted to be less than a degree of tension in a case that a predetermined rotation is not generated in the vehicle.

According to another aspect, there is provided a method of controlling an occupant protection device including a collision prediction unit configured to predict a collision state including a collision direction in a vehicle, a seat direction detection unit configured to detect a direction of a seat that is rotatable around a vertical axis of the vehicle with respect to the vehicle, and a driving unit configured to adjust a degree of tension of a seatbelt, the method causing a control computer of the occupant protection device to perform: controlling the driving unit in accordance with the collision direction with respect to the vehicle predicted by the collision prediction unit and the direction of the seat with respect to the vehicle detected by the seat direction detection unit; and changing the degree of tension of the seatbelt.

According to another aspect, there is provided a non-transitory computer-readable recording medium causing a control computer of an occupant protection device including a collision prediction unit configured to predict a collision state including a collision direction in a vehicle, a seat direction detection unit configured to detect a direction of a seat that is rotatable around a vertical axis of the vehicle with respect to the vehicle, and a driving unit configured to adjust a degree of tension of a seatbelt, to perform: controlling the driving unit in accordance with the collision direction with respect to the vehicle predicted by the collision prediction unit and the direction of the seat with respect to the vehicle detected by the seat direction detection unit; and changing the degree of tension of the seatbelt.

Advantageous Effects of Invention

According to an aspect, even in a case that a collision occurs in a vehicle in a state in which the rotatable seat is rotated, the degree of tension of the seatbelt can be changed based on the collision direction and the direction of the seat. Therefore, it is possible to improve safety in the protection of an occupant.

According to another aspect, since the degree of tension of the seatbelt can be adjusted to the predetermined degree based on the collision direction and the direction seen from the seat, it is possible to reliably protect the occupant and prevent the occupant from being excessively restrained on the seat.

According to another aspect, since the degree of tension of the seatbelt can be changed in accordance with the collision aspect occurring in the vehicle detected by the collision detection unit, it is possible to further improve the safety in the protection of the occupant.

According to another aspect, in a case that the collision detection unit detects that the vehicle is rotated, it is possible to adjust the degree of tension of the seatbelt in accordance with the rotation of the vehicle. Thus, it is possible to further improve the safety in the protection of the occupant.

DESCRIPTION OF EMBODIMENTS

Hereinafter, an occupant protection device, and a method and a program for controlling the occupant protection device according to the present invention will be described with reference to the drawings.

First Embodiment

Figure 1:
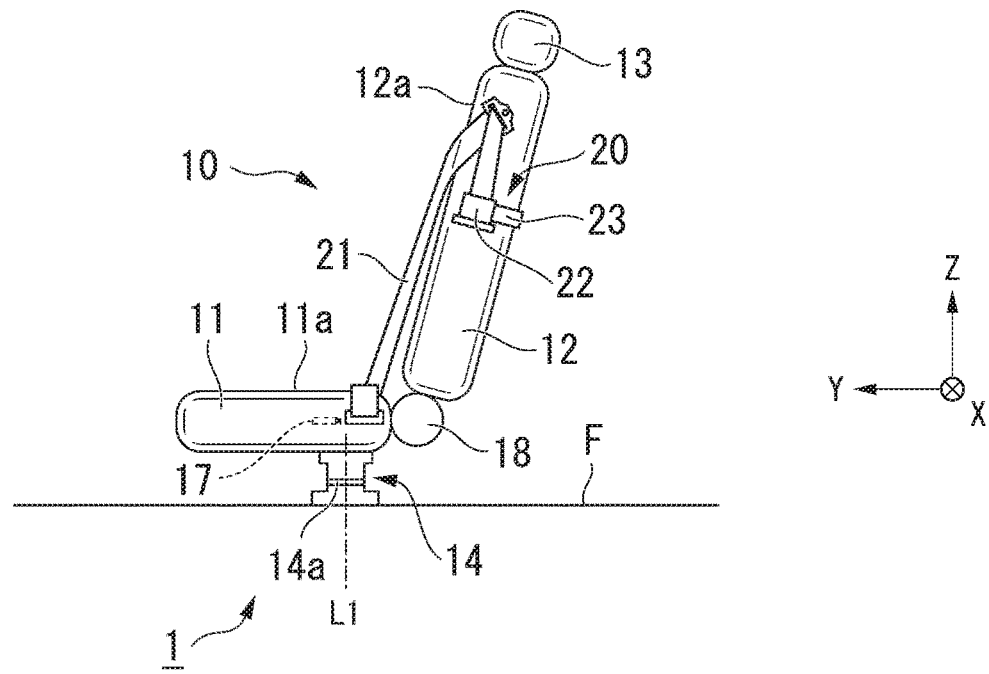
FIG. 1 is a side view showing a configuration of an occupant protection device according to a first embodiment.

FIG. 1 is a side view showing a configuration of an occupant protection device 1 according to a first embodiment. The occupant protection device 1 includes a vehicle seat 10 and a seatbelt device 20. The vehicle seat 10 on which an occupant sits is provided to be rotatable on a floor surface F. The seatbelt device 20 that protects the occupant at the time of a collision or the like is provided on one side surface of the vehicle seat 10. A vehicle (hereinafter referred to as a vehicle M) in which the occupant protection device 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, or a combination thereof. The electric motor operates using power generated by a power generator connected to the internal combustion engine or power discharged from a secondary cell or a fuel cell.

The vehicle seat 10 includes, for example, a seating unit 11 and a backrest unit 12. In the vehicle seat 10, one end of the seating unit 11 and the lower end of the backrest unit 12 are connected to be rotatable by a first connection unit 18. A headrest 13 is provided at the upper end of the backrest unit 12.

The seating unit 11 is a member that supports the lower half of the body of the occupant. A seat surface 11a on which the occupant D sits is formed on the seating unit 11. The seat surface 11a is formed of a material with a cushioning property. The seating unit 11 is mounted on the floor surface F via a rotational connection unit 14. The seating unit 11 is disposed to be rotatable around a rotational shaft L1 which is a vertical axis to the floor surface F by the rotational connection unit 14.

In a case that a rotational operation is performed, the seating unit 11 is fixed in, for example, one of the forward direction (the +Y direction), the rearward direction (the −Y direction), the left direction (the −X direction), and the right direction (the X direction) in the vehicle M. Instead of this, the seating unit 11 can be fixed at any angle. In the rotational connection unit 14, a seat direction detection unit 14a that detects a rotational direction of the seating unit 11 with respect to the floor surface F is provided. A seatbelt control unit 80 to be described below is connected to the seat direction detection unit 14a. The seat direction detection unit 14a outputs a detection result to the seatbelt control unit 80.

The backrest unit 12 is a member that supports the trunk of the occupant. In the backrest unit 12, a backrest surface 12a is formed. The backrest surface 12a is formed of a material with a cushioning property. A headrest 13 is provided at the end of the backrest unit 12. The headrest 13 supports the head or neck of the occupant sitting on the seating unit 11. The backrest unit 12 can be put in a reclining state by adjusting a rotational angle with respect to the floor surface F by the first connection unit 18. The first connection unit 18 has, for example, a rotational hinge structure.

The first connection unit 18 includes, for example, an urging unit (not shown) such as a rotational spring and the backrest unit 12 is urged in a direction (the +Y direction) in which an angle formed between the backrest unit 12 and the seating unit 11 is narrowed. In a case that a lever 17 is released, the backrest unit 12 falls forward (in the +Y direction) centering on the first connection unit 18 by an urging force of the first connection unit 18. In a case that the occupant applies his or her force rearward (in the −Y direction) to the backrest surface 12a in the released state of the lever 17, the backrest unit 12 falls rearward centering on the first connection unit 18.

Figure 2:
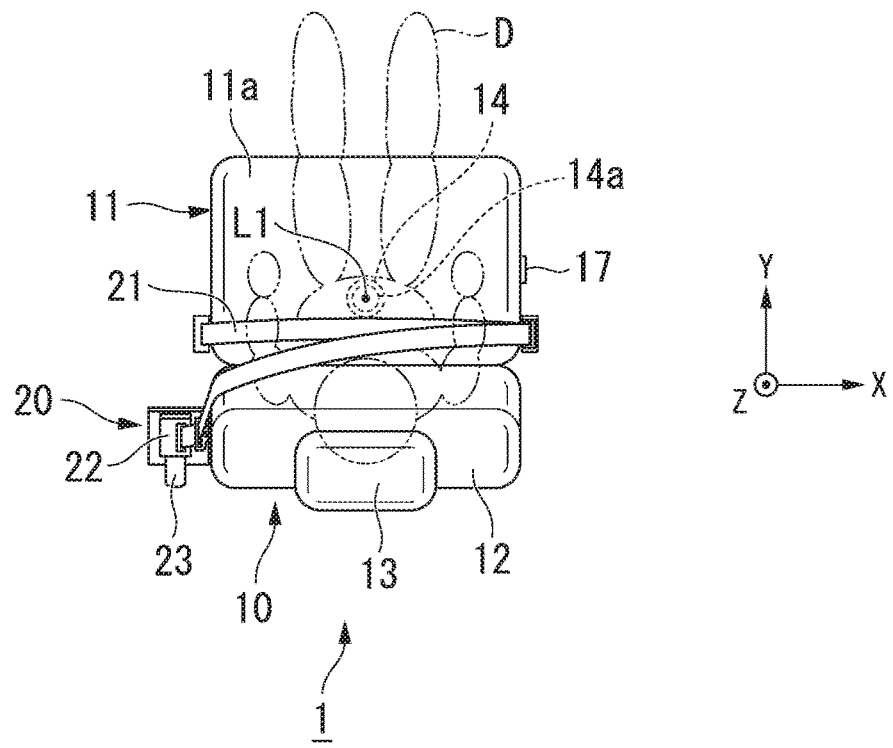
FIG. 2 is a plan view showing a configuration of the occupant protection device.

FIG. 2 is a plan view showing a configuration of the occupant protection device 1 according to the first embodiment. The seatbelt device 20 is mounted on one side between both side surfaces of the backrest unit 12. A position of the seatbelt device 20 is determined according to whether the vehicle seat 10 is provided on one side of the right and left sides of the vehicle M in a traveling direction, but the present invention is not limited thereto and the position of the seatbelt device 20 may be appropriately changed. The seatbelt device 20 may be embedded in the backrest unit 12.

The seatbelt device 20 is a three point type of seatbelt and includes a belt (seatbelt) 21, a winding device 22, and a driving unit 23. The belt 21 is accommodated in a state in which the belt 21 is wound in the winding device 22 in the accommodation state. An accommodation space (not shown) in which the belt 21 in the wound state is accommodated is formed in the winding device 22. The winding device 22 includes an urging unit (not shown) such as a rotational spring for winding the belt 21. The belt 21 is urged in a winding direction by the urging unit. In a case that the occupant D fastens the belt 21, a tension state of the belt 21 is maintained by the urging unit of the winding device 22 and slack of the belt 21 is reduced.

The occupant D extracts the belt 21 from the winding device 22 and the occupant D is restricted to the vehicle seat 10. At this time, the belt 21 binds the belly of the occupant D in the vehicle seat 10 in the horizontal direction and diagonally binds the upper half of the body of the occupant D. In a case that predetermined acceleration or more is added, the winding device 22 mechanically locks the extraction of the belt 21 and restrains the occupant D on the vehicle seat 10. The driving unit 23 that further winds the belt 21 by a driving force is connected to the winding device 22. The driving unit 23 is controlled by the seatbelt control unit 80 as will be described below.

The driving unit 23 is connected to a rotational shaft of winding of the belt 21, and thus the degree of tension of the belt 21 is adjusted by increasing or decreasing a tensile force of the belt 21 generated by the winding device 22. Hereinafter, control of the driving unit 23 will be described.

Figure 3:
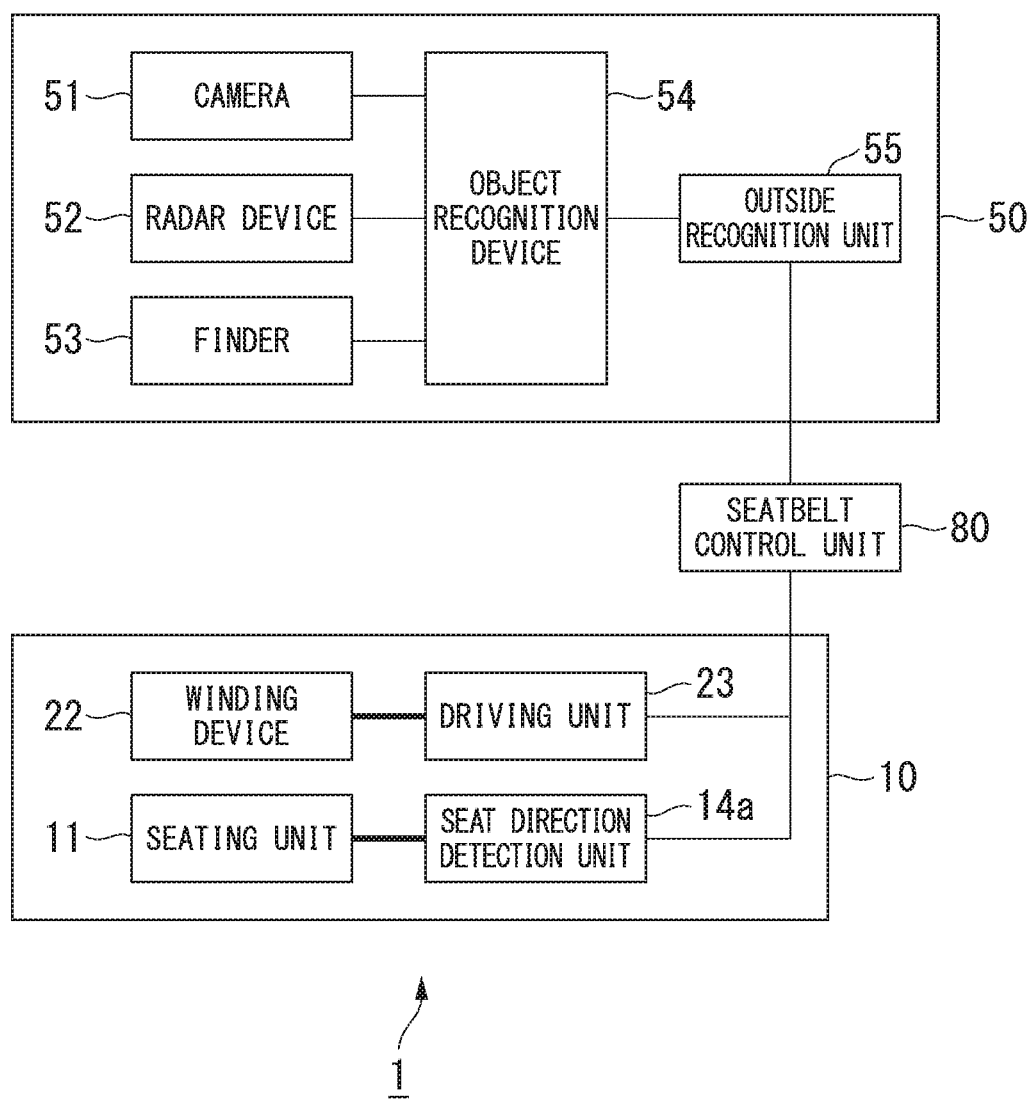
FIG. 3 is a block diagram showing a configuration of the occupant protection device.

FIG. 3 is a block diagram showing a configuration of the occupant protection device 1. The occupant protection device 1 includes the vehicle seat 10, a collision prediction unit 50, and the seatbelt control unit 80. The collision prediction unit 50 includes, for example, a camera 51, a radar device 52, a finder 53, an object recognition device 54, and an outside recognition unit 55. The collision prediction unit 50 predicts a collision state generated in the vehicle M in advance based on a periphery state of the vehicle M.

The vehicle seat 10 includes the driving unit 23 that drives the winding device 22. The vehicle seat 10 includes the seat direction detection unit 14a that detects a rotational direction of the seating unit 11. The seatbelt control unit 80 controls the driving unit 23 based on a prediction result of the collision prediction unit 50 and a detection result of the seat direction detection unit 14a. The outside recognition unit 55 and the seatbelt control unit 80 are each realized in a case that a processor such as a central processing unit (CPU) executes a program (software). Some or all of the functional units of the seatbelt control unit 80 to be described below may be realized by hardware such as a large scale integration (LSI) circuit, an application specific integrated circuit (ASIC), or a field-programmable gate array (FPGA) or may be realized by hardware and software in cooperation.

The camera 51 is, for example, a digital camera that uses a solid-state image sensor such as a charged coupled device (CCD) or a complementary metal oxide semiconductor (CMOS). The single camera 51 or the plurality of cameras 51 are mounted on any portion of the vehicle M in which the cameras are mounted. In a case that forward imaging is performed, the camera 51 is mounted on an upper portion of a front windshield, a rear surface of a rearview mirror, or the like. In a case that rearward imaging is performed, the camera 51 is mounted on an upper portion of a rear windshield, a backdoor, or the like. In a case that lateral imaging is performed, the camera 51 is mounted on a door mirror or the like. For example, the camera 51 repeatedly images the periphery of the vehicle M periodically. The camera 51 may be a stereo camera.

The radar device 52 radiates radio waves such as millimeter waves to the periphery of the vehicle M and detects radio waves (reflected waves) reflected from an object to detect at least a position (a distance and an azimuth) of the object. The single radar device 52 or the plurality of radar devices 52 are mounted on any portion of the vehicle M. The radar device 52 may detect a position and a speed of an object in conformity with a frequency modulated continuous wave (FMCW) scheme.

The finder 53 is a light detection and ranging finder or a laser imaging detection and ranging (LIDAR) finder that measures scattered light of radiated light and detects a distance to a target. The single finder 53 or the plurality of finders 54 are mounted on any portion of the vehicle M.

The object recognition device 54 performs a sensor fusion process on detection results from some or all of the camera 51, the radar device 52, and the finder 53 and recognizes a position, a type, a speed, and the like of an object. The object recognition device 54 outputs a recognition result to the outside recognition unit 55.

The outside recognition unit 55 recognizes states such as positions, speeds, acceleration, or the like of nearby vehicles based on information input from the camera 51, the radar device 52, and the finder 53 via the object recognition device 54. The positions of the nearby vehicles may be represented as representative points such as centers of gravity or corners of the nearby vehicles or may be represented as regions expressed by contours of the nearby vehicles. The "states" of the nearby vehicles may include acceleration or jerk of the nearby vehicles or "action states" (for example, whether the nearby vehicles are changing lanes or are attempting to change lanes).

The outside recognition unit 55 may recognize guardrails, electric poles, parked vehicles, people such as pedestrians, and positions of other objects in addition to the nearby vehicles. Thus, the outside recognition unit 55 recognizes a periphery state of the vehicle M and predicts a state in which acceleration is applied due to a collision or the like with the vehicle M. At this time, the outside recognition unit 55 predicts a collision direction in the vehicle M based on, for example, a temporal difference of recognized information.

In a case that the outside recognition unit 55 predicts that predetermined acceleration or more is applied in the collision direction due to a collision or the like with the vehicle M, a prediction result is output to the seatbelt control unit 80. For example, the outside recognition unit 55 predicts that the predetermined acceleration or more is applied in the collision direction in accordance with whether a preset threshold is exceeded.

The seatbelt control unit 80 controls the driving unit 23 and the driving unit 23 based on a prediction result of the outside recognition unit 55. In a case that it is predicted that the predetermined acceleration or more is applied in the collision direction in the vehicle M due to a collision or the like to the vehicle M, the seatbelt control unit 80 controls the driving unit 23 in accordance with a direction of the vehicle seat 10 based on an output result of the seat direction detection unit 14a and adjusts the degree of tension of the belt 21.

The seatbelt control unit 80 controls the driving unit 23 in accordance with the collision direction predicted by the outside recognition unit 55 with respect to the vehicle M and the direction of the seat detected by the seat direction detection unit 14a with respect to the vehicle M to change the degree of tension of the belt 21.

Figure 4:
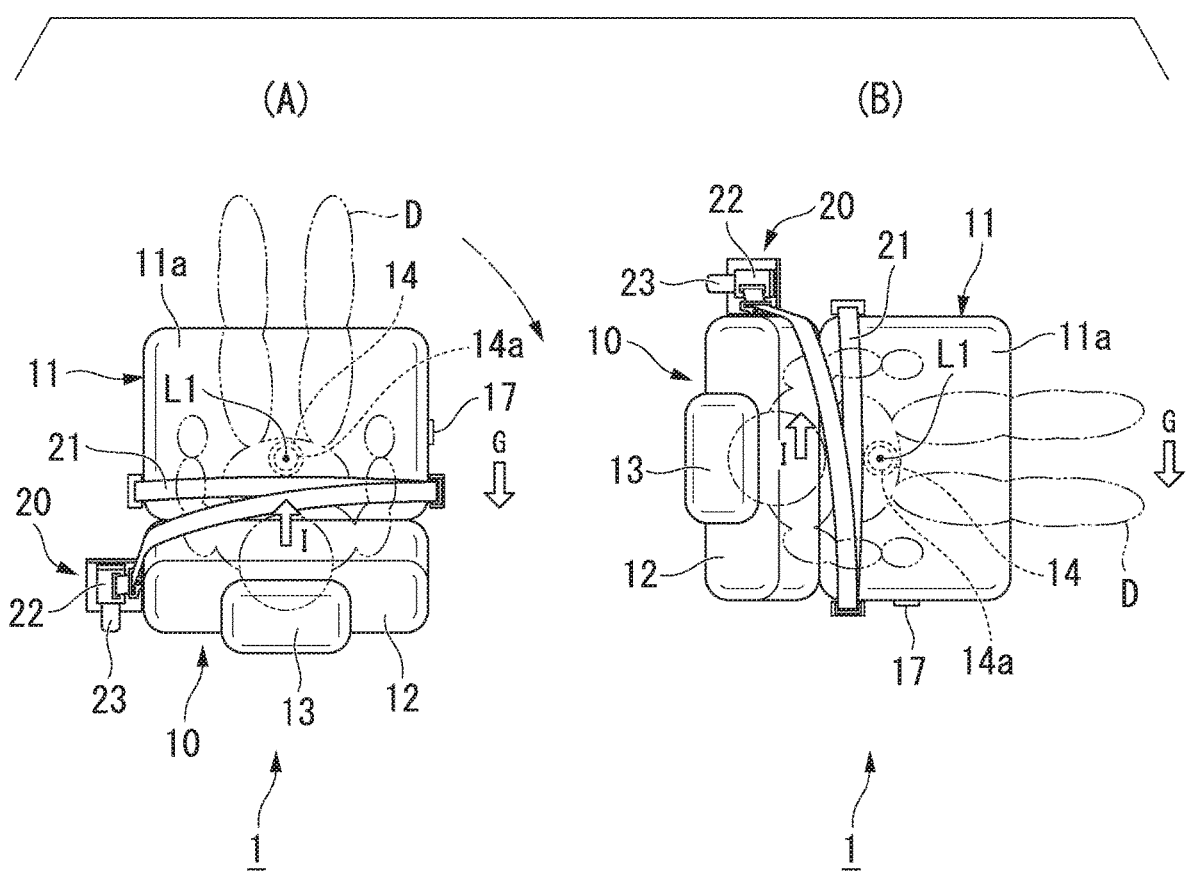
FIG. 4 is a diagram showing acceleration generated in a rotation state of a vehicle seat at the time of a collision.

FIG. 4 is a diagram showing acceleration generated in a rotation state of the vehicle seat 10 at the time of a collision. For example, in a case that the vehicle M collides on the forward direction (in the Y direction) in a state in which the vehicle seat 10 is rotated clockwise around the rotational shaft L1, acceleration G in a deceleration direction (the −Y direction) is applied to the vehicle M. At this time, an inertial force I to the body of the occupant D is generated on the forward direction (in the Y direction) which is an opposite direction to the acceleration G. In a case that the vehicle seat 10 faces forward (see FIG. 4(A)), the body of the occupant D to which the inertial force I is generated is restrained on the vehicle seat 10 by the belt 21.

In a case that the vehicle seat 10 faces in, for example, the right direction (the +X direction) (see FIG. 4(B)), there is concern about forward movement (in the +Y direction) of the body of the occupant D to which the inertial force I is generated between the vehicle seat 10 and the belt 21. Similarly, in a case that the vehicle seat 10 faces in the left direction (the −X direction), there is concern about forward movement (in the +Y direction) of the body of the occupant D to which the inertial force I is generated. In this state, in a case that the vehicle seat 10 faces in the right or left direction, a restraining force of the belt 21 is preferably greater than in a case that the vehicle seat 10 faces forward. Accordingly, in the occupant protection device 1, the restraining force of the belt 21 is changed in accordance with the collision direction with respect to a direction seen from the vehicle seat 10.

Figure 5:
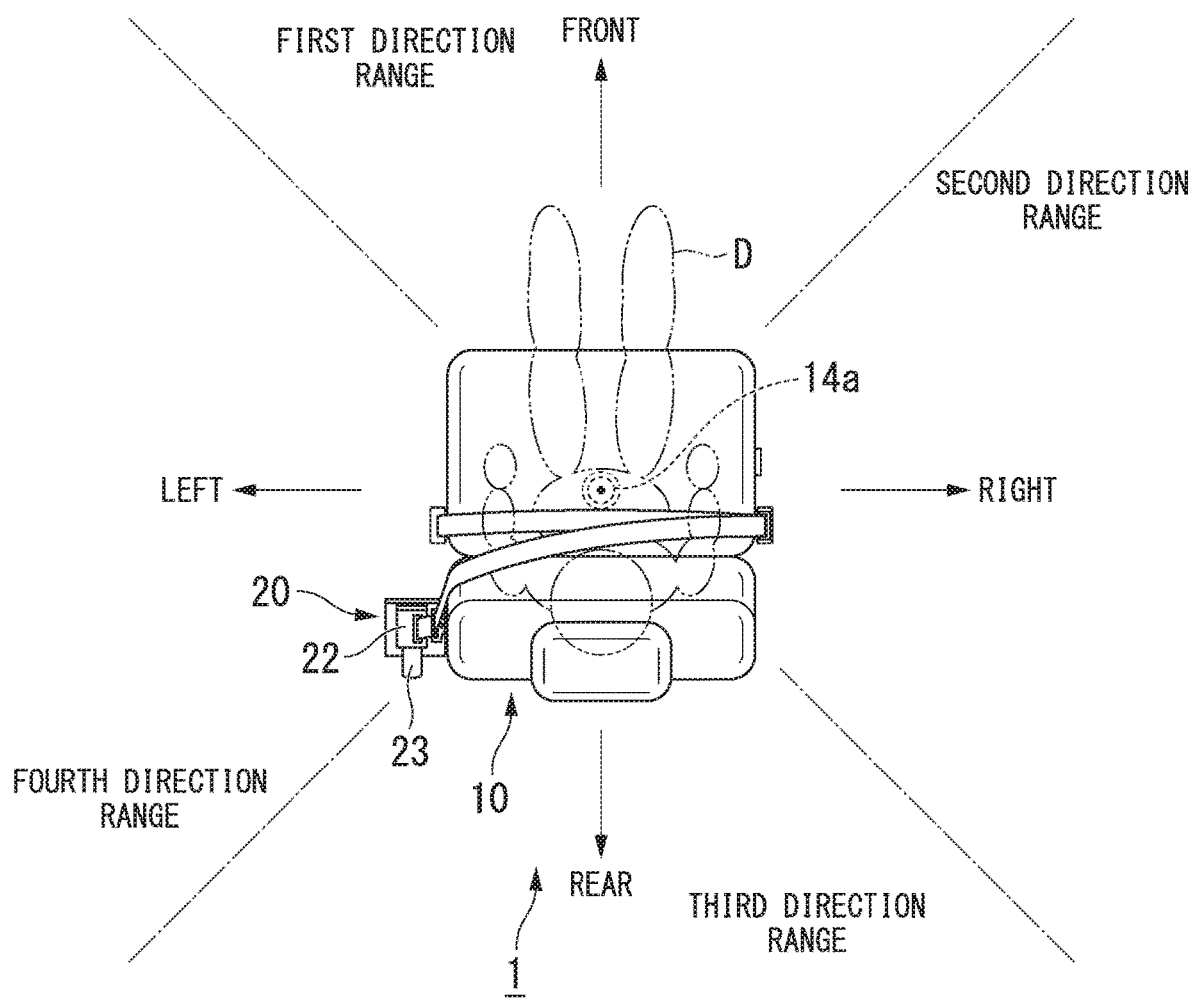
FIG. 5 is a diagram for defining a direction range in a direction seen from the vehicle seat.

FIG. 5 is a diagram for defining a direction range in a direction seen from the vehicle seat 10. In a case that the vehicle seat 10 is a reference, a direction seen from the vehicle seat 10 is four directions, the front, rear, right, and left directions. Angle ranges including these four directions are set. For example, a predetermined angle range including the front direction seen from the vehicle seat 10 is defined as a first direction range, a predetermined angle range including the right direction seen from the vehicle seat 10 is defined as a second direction range, a predetermined angle range including the rear direction seen from the vehicle seat 10 is defined as a third direction range, and a predetermined angle range including the left direction seen from the vehicle seat 10 is defined as a fourth direction range.

The predetermined angle ranges are set to, for example, 90°. A collision occurring in a collision direction included in the first direction range is referred to as a front collision. A collision occurring in a collision direction included in the second direction range is referred to as a right collision. A collision occurring in a collision direction included in the third direction range is referred to as a rear collision. A collision occurring in a collision direction included in the fourth direction range is referred to as a left collision. In the occupant protection device 1, the seatbelt device 20 is controlled in accordance with each direction range including each of the front, rear, right, and left directions viewed from the vehicle seat 10 and a relation between an angle of the vehicle seat 10 and the collision direction.

Figures 6, 7:
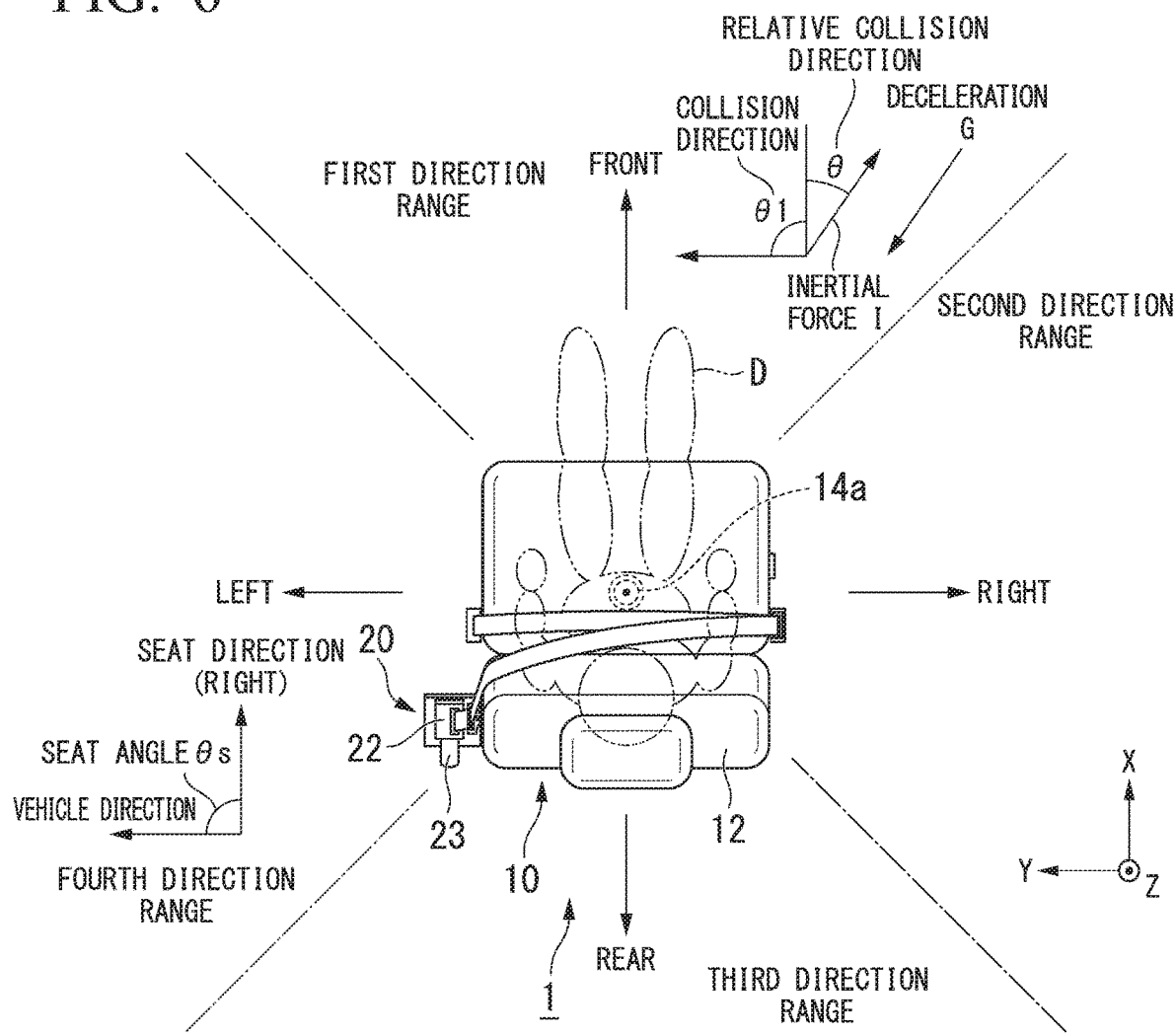
FIG. 6 is a diagram showing a state in which a collision occurs in a rotation state of the vehicle seat.
FIG. 7 is a diagram showing a control state of a seatbelt device applied to relevance between a seat direction and a collision direction in a vehicle.

FIG. 6 is a diagram showing a state in which a collision occurs in a rotation state of the vehicle seat 10. Here, a state in which the vehicle seat 10 is rotated in the right direction with respect to the vehicle M is exemplified. A relative collision direction θ to the vehicle seat 10 is estimated as a direction in which the inertial force I is generated due to deceleration G applied to the occupant D.

Before a collision occurs in the vehicle M, the outside recognition unit 55 predicts a collision direction θ1 with respect to the vehicle M. The seat direction detection unit 14a detects a seat angle θs of the vehicle seat 10 with respect to the vehicle M. The seatbelt control unit 80 calculates the relative collision direction θ with respect to the vehicle seat 10 by Expression (1) based on the collision direction θ1 and the seat angle θs.

$$\theta = \theta_1 - \theta_s \quad (1)$$

The seatbelt control unit 80 determines in which direction range the relative collision direction θ to the vehicle seat 10 is included. In the foregoing example, the relative collision direction θ is included in the first direction range including the front direction seen from the vehicle seat 10. Accordingly, the seatbelt control unit 80 determines that a front collision occurs in the vehicle seat 10 and performs control on the seatbelt device 20 in accordance with the front collision.

The seatbelt control unit 80 controls the driving unit 23 such that the belt 21 is wound and adjusts the degree of tension of the belt 21 to a first degree in accordance with the front collision with respect to the vehicle seat 10. The first degree is set by setting a pretensioner output and a load limiter load of the seatbelt device 20 through load control and an optimum output in accordance with the front collision. For example, the first degree is adjusted by increasing the pretensioner output and the load limiter load to 80% of a normal state.

Here, the "normal state" is a state in which no collision is predicted and is defined as a state in which the seatbelt control unit 80 performs no control on the seatbelt device 20. In addition, "80% of a case in which a state of control with the strongest force is assumed to be 100%" may be used rather than "the increase to 80% of the normal state." The same applies in the following description.

In a case that the relative collision direction θ to the vehicle seat 10 is determined to be included in the second direction range, the seatbelt control unit 80 determines that a right collision occurs in the vehicle seat 10 and performs control on the seatbelt device 20 in accordance with the right collision. As described above, in the right collision to the vehicle seat 10, it is necessary to adjust the degree of tension of the belt 21 to be relatively higher than in the front collision. Accordingly, the seatbelt control unit 80 controls the driving unit 23 to adjust the degree of tension of the belt 21 to a second degree higher than the first degree.

Similarly, in a case that the relative collision direction θ to the vehicle seat 10 is determined to be included in the fourth direction range, the seatbelt control unit 80 determines that a left collision occurs in the vehicle seat 10 and controls the driving unit 23 to adjust the degree of tension of the belt 21 to the second degree higher than the first degree. The second degree is adjusted by increasing the pretensioner output and the load limiter load to 100% of the normal state. That is, in the occupant protection device 1, in a case that a side collision occurs in the vehicle seat 10, concern of the occupant D being thrown from the vehicle seat 10 is reduced.

In a case that the relative collision direction θ to the vehicle seat 10 is determined to be included in the third direction range, the seatbelt control unit 80 determines that a rear collision occurs in the vehicle seat 10 and performs control on the seatbelt device 20 in accordance with the rear collision. In the rear collision, the backrest unit 12 supports the body of the occupant D. Therefore, the degree of tension of the belt 21 is adjusted to be less than the first degree. In a case that the rear collision is determined to occur in the vehicle seat 10, the seatbelt control unit 80 controls the driving unit 23 to adjust the degree of tension of the belt 21 to a third degree less than the first degree.

For example, the third degree is adjusted by increasing the pretensioner output and the load limiter load to 50% of the normal state. That is, in the occupant protection device 1, in a case that a rear end collision occurs in the vehicle seat 10, the occupant D is prevented from being excessively restrained by the belt 21.

FIG. 7 is a diagram showing a control state of the seatbelt device 20 applied to relevance between a seat direction and a collision direction in the vehicle M. In FIG. 7, control (1), control (2), and control (3) correspond to the first degree, the second degree, and the third degree, respectively. As shown, in accordance with the relevance between the collision direction and the seat direction in the vehicle M, the seatbelt control unit 80 performs control on the seatbelt device 20.

Figure 8:
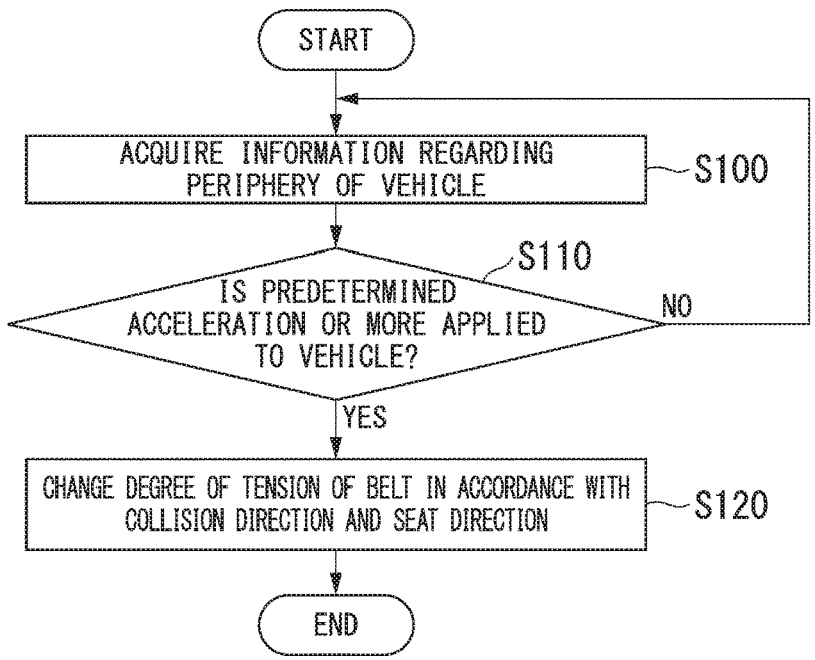
FIG. 8 is a flowchart showing a flow of a process of the occupant protection device.

Next, a flow of a process of the occupant protection device 1 will be described. FIG. 8 is a flowchart showing a flow of a process of the occupant protection device 1.

The outside recognition unit 55 acquires information regarding the periphery of the vehicle M based on information input from the camera 51, the radar device 52, and the finder 53 via the object recognition device 54 (step S100). The outside recognition unit 55 predicts a collision direction with respect to the vehicle M and whether predetermined acceleration or more is applied to the vehicle M based on the information regarding the periphery of the vehicle M (step S110).

In a case that the outside recognition unit 55 predicts that the predetermined acceleration or more is applied to the vehicle M, the predicted acceleration and the collision direction are output to the seatbelt control unit 80. The seatbelt control unit 80 controls the driving unit 23 in accordance with the collision direction with respect to the vehicle M predicted by the outside recognition unit 55 and the direction of the vehicle seat 10 with respect to the vehicle M detected by the seat direction detection unit 14a to change the degree of tension of the belt 21 (step S120).

In the occupant protection device 1 according to the above-described first embodiment, in a case that a collision occurs in the vehicle M, the degree of tension of the belt 21 can be adjusted in accordance with the direction of the vehicle seat 10 by detecting the collision direction in the vehicle M and the rotation state of the vehicle seat 10. Thus, it is possible to improve safety in protection of the occupant D.

Second Embodiment

The occupant protection device 1 according to the first embodiment changes the degree of tension of the belt 21 based on the collision protection of the vehicle M by the collision prediction unit 50 and protects the occupant. In a second embodiment, the degree of tension of the belt 21 is changed in accordance with a situation of the vehicle M occurring after a collision in addition to collision prediction.

Figure 9:
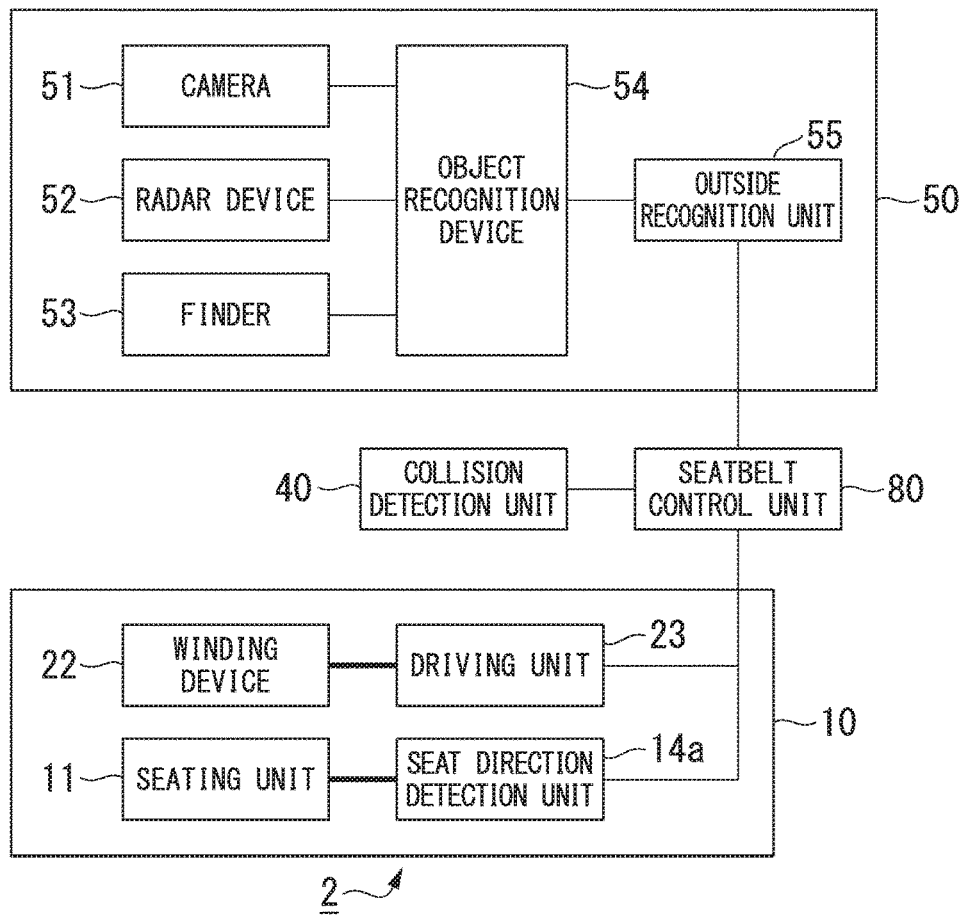
FIG. 9 is a block diagram showing a configuration of an occupant protection device according to a second embodiment.

FIG. 9 is a block diagram showing a configuration of an occupant protection device 2 according to the second embodiment. In the occupant protection device 2 according to the second embodiment, a collision detection unit 40 is further added to the configuration of the occupant protection device 1. The collision detection unit 40 includes, for example, a six-axis acceleration sensor or a strain gauge. The collision detection unit 40 detects acceleration of the vehicle M or deformation of the vehicle body occurring at the time of a collision. The seatbelt control unit 80 determines a collision aspect such as a collision speed, the degree of shock, deformation of the vehicle body, and rotation of the vehicle body occurring in the vehicle M based on a detection result of the collision detection unit 40.

The seatbelt control unit 80 controls the driving unit 23 of the seatbelt device 20 in accordance with the collision aspect of the vehicle M determined based on the detection result of the collision detection unit 40 to change the degree of tension of the belt 21. For example, in a case that rollover (overturning: an example of predetermined rotation) is determined to occur in the vehicle M, the seatbelt control unit 80 controls the driving unit 23, for example, to adjust the degree of tension of the belt 21 to a fourth degree less than the third degree. The overturning refers to a state in which the vehicle M is rotated in a roll direction or a pitch direction and wheels are oriented in the transverse direction or the upward direction (or beyond the state).

The fourth degree is adjusted, for example, by increasing the pretensioner output and the load limiter load by 30% of the normal state. In a case that a posture of the vehicle M stops in the overturning state after the overturning of the vehicle M, the seatbelt control unit 80 controls the driving unit 23 of the seatbelt device 20 to adjust the degree of tension of the belt 21 to be less than the degree of tension in a case that the predetermined rotation does not occur so that the occupant D can easily escape from the vehicle seat 10.

That is, in a case that rollover occurs in the vehicle seat 10, the occupant protection device 2 appropriately restrains the occupant D on the vehicle seat 10 and prevents the occupant D from being excessively restrained by the belt 21. As a result, the occupant D who attempts to escape from the overturned vehicle M is not hindered from unfastening the belt 21.

Figures 10, 11:
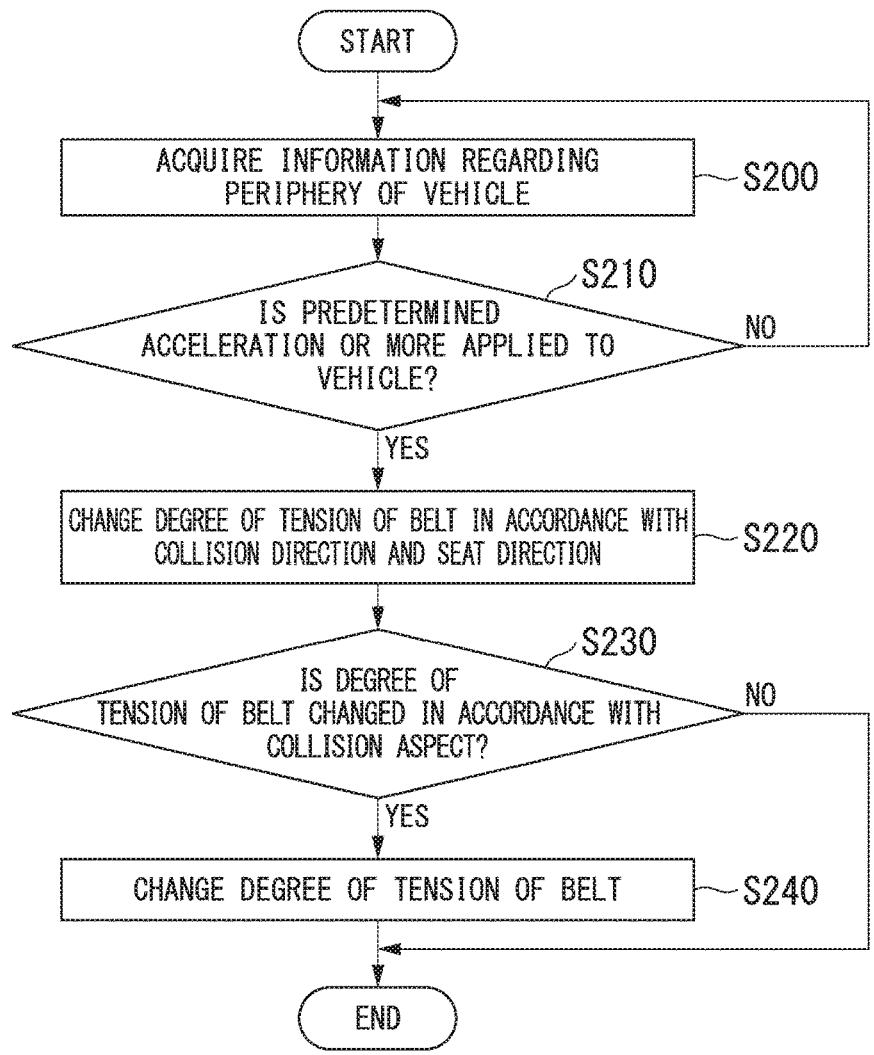
FIG. 10 is a diagram showing a control state of a seatbelt device applied to a relation between a seat direction and a collision direction in a vehicle.
FIG. 11 is a flowchart showing a flow of a process of the occupant protection device.

FIG. 10 is a diagram showing a control state of the seatbelt device 20 applied to a relation between a seat direction and a collision direction in the vehicle M. In FIG. 10, control (1), control (2), control (3), and control (4) correspond to the first degree, the second degree, the third degree, and the fourth degree, respectively. As shown, in accordance with the relevance between the collision direction and the seat direction in the vehicle M, the seatbelt control unit 80 performs control on the seatbelt device 20 and also performs control on the seatbelt device 20 in accordance with a collision aspect of the vehicle M. In the control of the seatbelt device 20 in accordance with the collision aspect of the vehicle M, the degree of other tension may be appropriately set in accordance with other collision aspects in addition to the rollover.

Next, a flow of a process of the occupant protection device 2 will be described. FIG. 11 is a flowchart showing a flow of a process of the occupant protection device 2. Steps 200 to 220 are similar to the process of the first embodiment. The collision detection unit 40 detects a change occurring in the vehicle M at the time of a collision of the vehicle M. The seatbelt control unit 80 controls the driving unit 23 of the seatbelt device 20 and determines whether to change the degree of tension of the belt 21 in accordance with the collision aspect of the vehicle M based on a detection result of the collision detection unit 40 (step 230). In a case that the seatbelt control unit 80 determines the change in the degree of tension of the belt 21 in accordance with the collision aspect of the vehicle M (Yes in step 230), the seatbelt control unit 80 controls the driving unit 23 to change the degree of tension of the belt 21 in accordance with the collision aspect (step S240).

In the occupant protection device 2 according to the above-described second embodiment, the degree of tension of the belt 21 can be changed in accordance with the collision aspect by determining the collision aspect at the time of a collision of the vehicle M. In the occupant protection device 2, the degree of tension of the belt 21 can be changed in accordance with the collision aspect of the vehicle M changed due to an actual collision. Therefore, it is possible to further improve safety in protection of the occupant D.

Modes for carrying the present invention have been described using the embodiments, but the present invention is not limited to these embodiments and various modifications and substitutions can be made within the scope of the present invention without departing from the gist of the present invention.

REFERENCE SIGNS LIST

1 Occupant protection device
2 Occupant protection device
10 Vehicle seat
11 Seating unit
11a Seat surface
12 Backrest unit
12a Backrest surface
13 Headrest
14 Rotational connection unit
14a Seat direction detection unit
17 Lever
18 First connection unit
20 Seatbelt device
21 Belt
22 Winding device
23 Driving unit
40 Collision detection unit
50 Collision prediction unit
51 Camera
52 Radar device
53 Finder
54 Object recognition device
55 Outside recognition unit
80 Seatbelt control unit
M Vehicle

What is claim is:

1. An occupant protection device comprising:
a collision prediction unit configured to predict a collision state including a collision direction in a vehicle;
a seat direction detection unit configured to detect a direction of a seat that is rotatable around a vertical axis of the vehicle with respect to the vehicle;
a driving unit configured to adjust a degree of tension of a seatbelt; and
a control unit configured to control the driving unit in accordance with the collision direction with respect to the vehicle predicted by the collision prediction unit and the direction of the seat with respect to the vehicle detected by the seat direction detection unit to change the degree of tension of the seatbelt,
wherein the control unit controls the driving unit to adjust the degree of tension of the seatbelt to a first degree in a case that the collision direction is included in a predetermined angle range including a front direction seen from the seat, and
the control unit controls the driving unit to adjust the degree of tension of the seatbelt to a second degree greater than the first degree in a case that the collision direction is included in a predetermined angle range including one of a left direction and a right direction seen from the seat.

2. An occupant protection device comprising:
a collision prediction unit configured to predict a collision state including a collision direction in a vehicle;
a seat direction detection unit configured to detect a direction of a seat that is rotatable around a vertical axis of the vehicle with respect to the vehicle;
a driving unit configured to adjust a degree of tension of a seatbelt; and
a control unit configured to control the driving unit in accordance with the collision direction with respect to the vehicle predicted by the collision prediction unit and the direction of the seat with respect to the vehicle detected by the seat direction detection unit to change the degree of tension of the seatbelt,
wherein the control unit controls the driving unit to adjust the degree of tension of the seatbelt to a first degree in a case that the collision direction is included in a predetermined angle range including a front direction seen from the seat, and
the control unit controls the driving unit to adjust the degree of tension of the seatbelt to a third degree less than the first degree in a case that the collision direction is included in a predetermined angle range including a rear direction seen from the seat.

3. An occupant protection device comprising:
a collision prediction unit configured to predict a collision state including a collision direction in a vehicle;
a seat direction detection unit configured to detect a direction of a seat that is rotatable around a vertical axis of the vehicle with respect to the vehicle;
a driving unit configured to adjust a degree of tension of a seatbelt; and
a control unit configured to control the driving unit in accordance with the collision direction with respect to the vehicle predicted by the collision prediction unit and the direction of the seat with respect to the vehicle detected by the seat direction detection unit to change the degree of tension of the seatbelt, and
a collision detection unit configured to detect a collision generated in the vehicle,
wherein the control unit determines a collision aspect of the vehicle based on a detection result of the collision detection unit and controls the driving unit in accordance with the collision aspect to change the degree of tension of the seatbelt, and
in a case that it is determined based on the detection result of the collision detection unit that a predetermined rotation is generated in the vehicle due to the collision, the control unit controls the driving unit such that the degree of tension of the seatbelt is adjusted to be less than a degree of tension in a case that the predetermined rotation is not generated in the vehicle.

* * * * *